United States Patent [19]

Hayes

[11] Patent Number: 4,880,442
[45] Date of Patent: * Nov. 14, 1989

[54] POLYIMIDE GAS SEPARATION MEMBRANES

[75] Inventor: Richard A. Hayes, Hockessin, Del.

[73] Assignee: E. I. Du Pont de Nemours and Company, Wilmington, Del.

[ * ] Notice: The portion of the term of this patent subsequent to Jan. 5, 2005 has been disclaimed.

[21] Appl. No.: 136,846

[22] Filed: Dec. 22, 1987

[51] Int. Cl.$^4$ .............................................. B01D 53/22
[52] U.S. Cl. .......................................... 55/16; 55/68; 55/158
[58] Field of Search .......................... 55/16, 68, 158; 210/500.39

[56] References Cited

U.S. PATENT DOCUMENTS

| | | |
|---|---|---|
| Re. 30,351 | 1/1980 | Hoehn et al. ............................ 55/16 |
| 3,423,491 | 1/1969 | McLain et al. ....................... 264/49 |
| 3,822,202 | 7/1974 | Hoehn et al. ........................ 210/23 |
| 3,957,651 | 5/1976 | Kesting ................................ 210/490 |
| 4,113,628 | 9/1978 | Alegranti .................... 210/500.39 X |
| 4,240,914 | 12/1980 | Iwama et al. .................. 210/500.39 |
| 4,378,324 | 3/1983 | Makino et al. ............. 210/500.39 X |
| 4,378,400 | 3/1983 | Makino et al. ...................... 428/220 |
| 4,440,643 | 4/1984 | Makino et al. ................... 55/158 X |

(List continued on next page.)

FOREIGN PATENT DOCUMENTS

| | | | |
|---|---|---|---|
| 2050251 | 7/1969 | France . | |
| 5344 | 1/1983 | Japan ................................. | 55/158 |
| 8512 | 1/1983 | Japan ................................. | 55/158 |
| 225705 | 12/1984 | Japan ................................. | 55/158 |

(List continued on next page.)

*Primary Examiner*—Robert Spitzer
*Attorney, Agent, or Firm*—Frank C. Hilberg, Jr.

[57] ABSTRACT

Aromatic polyimide gas separation membranes containing the repeating unit:

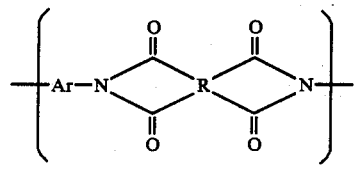

where —Ar— is

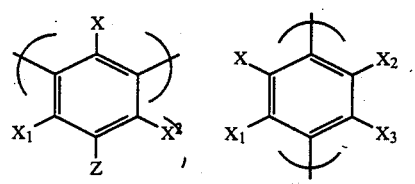

or mixtures thereof,

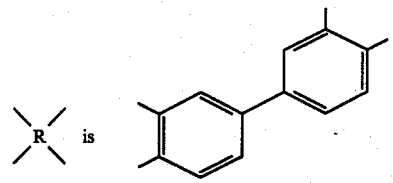

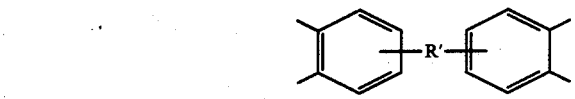

or mixtures thereof

Where —X, $X_1$, $X_2$, and $X_3$ are independently primary or secondary alkyl groups having 1 to 6 carbon atoms preferably methyl or ethyl, —Z is —H, —X, —$X_1$, —$X_2$, or —$X_3$ and R' is

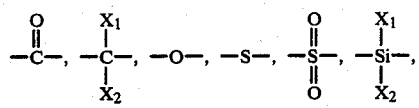

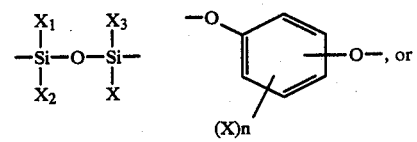

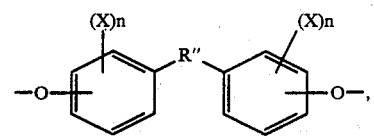

where n=0 to 4 or alkylene radicals of 1 to 3 carbon atoms and —R''— is

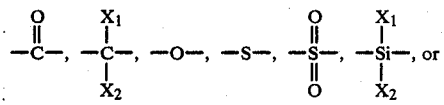

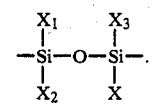

8 Claims, No Drawings

U.S. PATENT DOCUMENTS

| | | | |
|---|---|---|---|
| 4,474,662 | 10/1984 | Makino et al. | 55/158 X |
| 4,474,858 | 10/1984 | Makino et al. | 55/158 X |
| 4,485,056 | 11/1984 | Makino et al. | 210/500.39 X |
| 4,486,376 | 12/1984 | Makino et al. | 210/500.39 X |
| 4,512,893 | 4/1985 | Makino et al. | 55/158 X |
| 4,528,004 | 7/1985 | Makino et al. | 55/158 |
| 4,532,041 | 7/1985 | Shuey et al. | 210/500.39 |
| 4,629,685 | 12/1986 | Pfeifer | 430/583 |
| 4,629,777 | 12/1986 | Pfeifer | 528/353 |
| 4,690,873 | 9/1987 | Makino et al. | 55/158 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,718,921 | 1/1988 | Makino et al. | 55/16 |

FOREIGN PATENT DOCUMENTS

| | | | |
|---|---|---|---|
| 22902 | 2/1985 | Japan | 55/158 |
| 82103 | 5/1985 | Japan | 55/158 |
| 125204 | 7/1985 | Japan | 210/500.39 |
| 125205 | 7/1985 | Japan | 210/500.39 |
| 125209 | 7/1985 | Japan | 210/500.39 |
| 125210 | 7/1985 | Japan | 55/158 |
| 150806 | 8/1985 | Japan | 210/500.39 |
| 257805 | 12/1985 | Japan | 55/158 |
| 133106 | 6/1986 | Japan | 210/500.39 |
| 133117 | 6/1986 | Japan | 55/158 |
| 133118 | 6/1986 | Japan | 55/158 |

POLYIMIDE GAS SEPARATION MEMBRANES

FIELD OF THE INVENTION

The present invention relates to certain substituted aromatic polyimide separation membranes particularly useful for separating gases and the process of using them. This class of polyimide membrane materials is compositionally prepared from alkyl-substituted phenylenediamines with aromatic dianhydrides.

BACKGROUND OF THE INVENTION

Applicant filed Ser. No. 853,341 on Apr. 17, 1986, which issued as U.S. Pat. No. 4,705,540 on Nov. 10, 1987; Ser. No. 923,485 on Oct. 27, 1986, which issued as U.S. Pat. No. 4,717,393 on Jan. 5, 1988; and, Ser. No. 923,486 on Oct. 27, 1986, which issued as U.S. Pat. No. 4,717,394 on Jan. 5, 1988. These references concern polyimide membranes.

U.S. Pat. No. 4,629,685 and U.S. Pat. No. 4,629,777 disclose alkyl substituted aromatic polyimides for use in the electronics industry.

U.S. Pat. No. 3,822,202 and U.S. Re No. 30,351 disclose aromatic polyimide gas separation membranes in which the molecular structure is such that the molecules in the polymer are unable to pack densely and, therefore, have high gas permeation rates.

U.S. Pat. No. 4,378,400 discloses aromatic polyimide gas separation membranes in which the molecular structure is such that the molecules in the polymer can pack densely.

DETAILED DESCRIPTION

The present invention relates to the discovery that aromatic polyimides prepared by polycondensation of essentially non-rigid dianhydrides with phenylenediamines having substituents on all positions ortho to the amine functions form membranes with exceptional gas permeability. These increases in productivity of these membranes are believed to be due to the high molecular free volume in the polymer structure resulting from the rigid nature of the rotationally hindered polyimide linkage.

Generally, extremely high gas permeation through dense polymeric membranes is found only with low glass transition temperature (Tg) materials, such as silicone rubbers and a few polyolefin polymers. The low Tg materials are generally only useful as the dense separating layer in composite membranes, where a supporting porous membrane substructure provides structural integrity.

Known high Tg polymeric materials which may possess high gas selectivities, do not possess extremely high gas permeabilities. Examples reported involve mostly unsubstituted, or partially substituted, polymers subject to forming close-chain packing during fabrication and/or use.

The present invention circumvents the above shortcomings and provides high gas productivity dense membranes using aromatic polyimides containing the repeating unit:

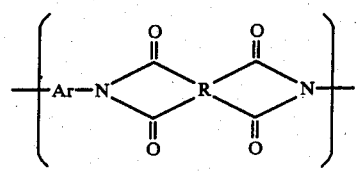

where —Ar— is

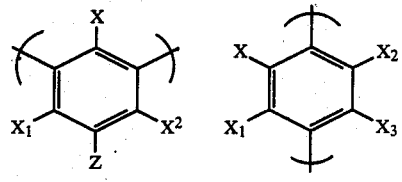

or mixtures thereof,

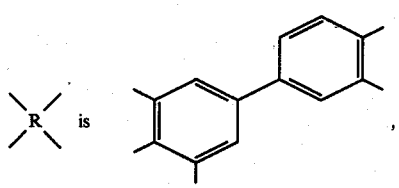

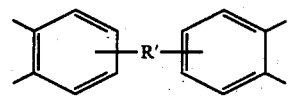

or mixtures thereof

Where —X, $X_1$, $X_2$, and $X_3$ are independently primary or secondary alkyl groups having 1 to 6 carbon atoms preferably methyl or ethyl, —Z is —H, —X, —$X_1$, —$X_2$, or —$X_3$ and R' is

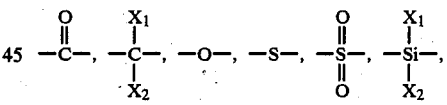

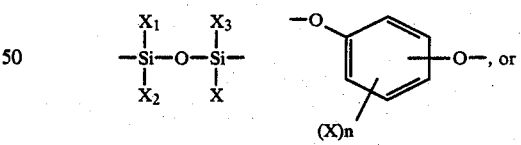

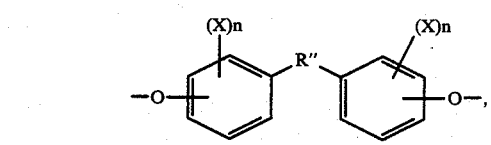

where n=0 to 4 or alkylene radicals of 1 to 3 carbon atoms and —R"— is

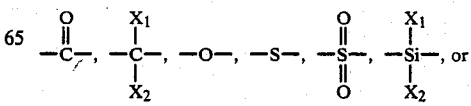

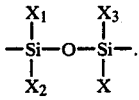

The polymers are considered linear polymers in that they are not crosslinked.

The multiple substitutions ortho to the amine functions in the above illustrated structures sterically restrict free rotation around the imide linkage. This causes the aromatic residue of the diamine function to be held out of the plane of the imide function and the aromatic residue of the dianhydride function. Electronic ring conjugation within the aromatic polyimide chain is, therefore, greatly reduced. Further, the before-mentioned alkyl substituents sterically block strong electronic interactions between different polyimide chains within the membrane. It is believed that these structural considerations allow for a greater molecular free volume within the membranes of this invention which leads to the exceptionally high gas permeabilities found.

The polyimides described in this invention have high inherent thermal stabilities. They are generally stable up to 400° C. in air or inert atmospheres. The glass transition temperatures of these polyimides are generally about 300° C. The high temperature characteristics of these polyimides can help to prevent membrane compaction problems observed with other polymers at even moderate temperatures, and extends the range of use of these membranes to high temperatures.

The polyimide membranes disclosed herein are useful for the enrichment of oxygen and nitrogen from air for increased combustion or inerting streams, respectively; recovery of hydrogen in refinery and ammonia plants; separation of carbon monoxide from hydrogen in syngas system; and separation of carbon dioxide or hydrogen sulfide from hydrocarbons.

EXAMPLES

EXAMPLE 1

To a stirred solution of 2,4,6-trimethyl-1,3-phenylenediamine (30.04 g, 0.20 mole) in N-methylpyrrolidone (450 ml) was portionwise added 3,3',4,4'-biphenyltetracarboxylic acid dianhydride (58.8 g, 0.20 mole, added in 3 portions, last portion washed in with 50 ml N-methylpyrrolidone) under an inert atmosphere at 50° C. After stirring for 2 hours at 50°-55° C., a solution of acetic anhydride (81.7 g, 0.80 mole) and triethylamine (82.0 g, 0.80 mole) was added with rapid stirring. After stirring for 15 minutes at 56° C., the reaction solution gelled. The reaction mixture was precipitated in water after sitting for 2 hours. The resulting solid was washed in methanol and dried in a vacuum oven at room temperature overnight, at 100° C. for 3 hours and at 220° C. for 3 hours to give 91.1 g product.

A film of the above polyimide was prepared by pouring a 2% polymer solution in dichloromethane (based on weight) into a ring-form 9.0 cm in diameter resting on a glass plate to a solution height of 0.16. The film was dried on the plate at room temperature and removed from the plate by soaking in water. The film was further dried in a vacuum oven at 70° C. for more than 6 hours.

The above film (film thickness=1.6 mils, $4 \times 10^{-5}$ m) was tested for mixed gas $O_2/N_2$ (21/79) (mole) permeability at 500 psig ($3.45 \times 10^6$ mPa), 25° C. The results are reported below:

$O_2$ Productivity: 700 centiBarrer.
$O_2/N_2$ Selectivity: 3.8.

A centiBarrer is the number of cubic centimeters of gas passed by the membrane at standard temperature and pressure times the thickness of the membrane in centimeters times $10^{-12}$ divided by the permeating area of the membrane in square centimeters times the time in seconds times the partial pressure difference across the membrane in cmHg, i.e., $$\text{CentiBarrer} = 10^{-12} \frac{cm^3(STP) \cdot cm}{cm^2 \cdot sec \cdot cmHg}$$

EXAMPLE 2

N-Methylpyrrolidone (750 ml) was added to a mixture of 3,3',4,4'-benzophenonetetracarboxylic acid dianhydride (64.44 g, 0.20 mol) and 2,4,6-trimethyl-1,3-phenylenediamine (30.5 g 0.20 mol) at 50° C. in an inert atmosphere with stirring. The resulting golden viscous solution was stirred at 50° C. for 3 hours. A solution of acetic anhydride (75.84 ml, 0.80 mol) and triethylamine (112.94 ml, 0.81 mol) was added with stirring at 50° C. causing the color to change from golden to a dark orange. After stirring for 1.5 hours at 50° C., the viscous solution was precipitated in methanol and the resulting white solid collected by filtration. The polymer was dried in a vacuum oven at room temperature overnight, at 100° C. for 3 hours and at 200° C. for 4 hours to give the product (85.2 g) as a light yellow solid.

Films were cast from a 10% solution (based on weight) of the above polymer in N-methylpyrrolidone onto a glass plate treated with TEFLON ® dry-lubricant at 80° C. with a 15-mil ($38 \times 10^{-5}$ m) knife gap. TEFLON ® dry lubricant contains a fluorocarbon telomer which reduces the adhesion of the membrane to the glass plate. The films were dried on the plate at room temperature, stripped off the plate and dried at room temperature overnight in a vacuum oven, and at 220° C. for 6 hours in a vacuum oven.

Differential Scanning Calorimetry (DSC) was performed on the above film using a Du Pont Thermal Analyzer Model 990-3 with cell model HCB1-S/N00523, Baseline scope=5.0 in a nitrogen atmosphere at a 10° C./minute progress rate. No transitions correlatable to a Tg or Tm were observed up to 400° C.

Thermogravimetric Analysis (TGA) was performed on the above film using a Du Pont Thermogravimetric Analyzer Model 99-2 with cell Model 951-5 in a nitrogen atmosphere at a 10° C./minute progress rate. A 10% weight loss was observed at 565° C. and a 40% weight loss was observed at 695° C.

The above films (film thickness 1.0 mil, $2.54 \times 10^{-5}$ m and 0.9 mil, $2.29 \times 10^{-5}$ m respectively) were tested for mixed gas $CO_2/CH_4$ (50/50) (mole) permeabilities at 250 psig, ($172 \times 10^5$ Pa), 25° C. Results are reported below:

| | | |
|---|---|---|
| $CO_2$ | Productivity: | 3,746 centiBarrer |
| $CH_4$ | Productivity: | 115 centiBarrer |
| $CO_2/CH_4$ | Selectivity: | 32.4 |
| or | | |
| $CO_2$ | Productivity: | 3,796 centiBarrer |
| $CH_4$ | Productivity: | 122 centiBarrer |
| $CO_2/CH_4$ | Selectivity: | 31 |

The above films (film thickness=1.0 mil, $2.54 \times 10^{-5}$ m) were tested for mixed gas $H_2/CH_4$ (50/50) (mole) permeabilities at 400 psig ($276 \times 10^5$ Pa), 25° C. The results are reported below:

| | | |
|---|---|---|
| $H_2$ | Productivity: | 4,790 centiBarrer |
| $H_2/CH_4$ | Selectivity: | 52 |

EXAMPLE 3

To a stirred solution of 2,3,5,6-tetramethyl-1,4-phenylenediamine (24.64 g, 0.15 mol) in N-methylpyrrolidone (400 ml) under an inert atmosphere at room temperature was portionwise added 3,3',4,4'-benzophenonetetracarboxylic acid dianhydride (48.33 g, 0.15 mol, added in four portions, last portion washed with N-methyl pyrrolidone (120 ml)). After stirring 3 hours at room temperature, a solution of acetic anhydride (56.88 ml, 0.60 mol), and triethylamine (84.21 ml, 0.60 mol) was rapidly added causing a white solid to precipitate out of the lemony yellow solution. The solid went back into solution to form a dark orange viscous solution which was stirred at room temperature for 2 hours. The reaction solution was precipitated in water and the resulting solid collected by filtration, washed with methanol and dried in a vacuum oven at room temperature overnight, at 100° C. for 3 hours and at 220° C. for 3 hours to give a 66.6 g product.

Films were cast from a 15% solution (based on weight) of the above polymer in N-methylpyrrolidone onto a glass plate treated with TEFLON ® dry lubricant at 80° C. with a 15-mil ($38 \times 10^{-5}$ m) knife gap. The films were dried on the plate at 80° C. for 25 minutes, cooled to room temperature and dried in a vacuum oven at room temperature overnight.

The films were stripped off the plate and further dried in a vacuum oven at 100° C. for 4 hours.

The above films (film thickness 1.1 mil, $2.8 \times 10^{-5}$ m) were tested for mixed gas $CO_2/CH_4$ (50/50) (mole) permeabilities at 245 psig ($171 \times 10^5$ Pa), 25° C. Results are reported below:

| | | |
|---|---|---|
| $CO_2$ | Productivity: | 2,671 centiBarrer |
| $CO_2/CH_4$ | Selectivity: | 8.5 |

The above films (film thickness 1.4 mil, $3.6 \times 10^{-5}$ m) were tested for mixed gas $H_2/CH_4$ (50/50) (mole) permeabilities at 400 psig ($276 \times 10^5$ Pa), 25° C. The results are reported below:

| | | |
|---|---|---|
| $H_2$ | Productivity: | 3,350 centiBarrer |
| $H_2/CH_4$ | Selectivity: | 25.2 |

I claim:

1. A process for separating one or more gases from a mixture of two or more gases comprising bringing said mixture of two or more gases under pressure into contact with one side of an aromatic gas separation membrane consisting essentially of repeating linear units of the formula:

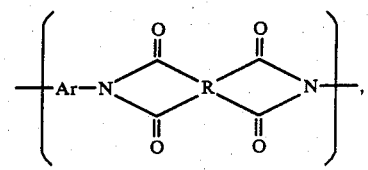

where —Ar— is

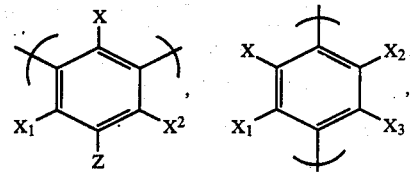

or mixtures thereof,

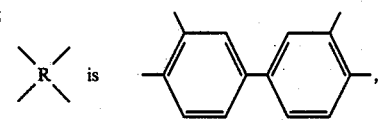 is 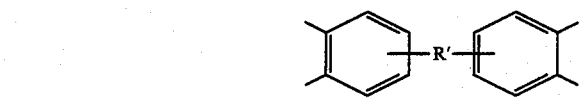

or mixtures thereof, where —X, —$X_1$, —$X_2$, and —$X_3$ are independently primary or secondary alkyl groups having 1 to 6 carbon atoms, —Z is —H, —X, —$X_1$, —$X_2$, or —$X_3$ and R' is

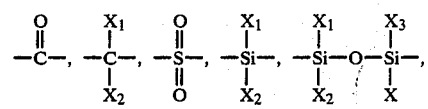

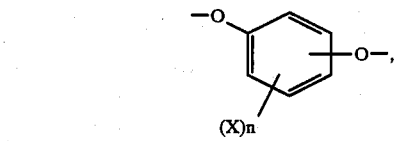

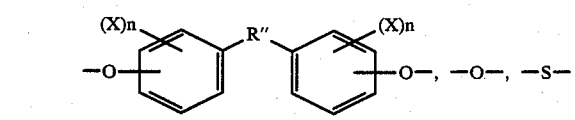

or alkylene groups of 1 to 3 carbon atoms, and —R"— is

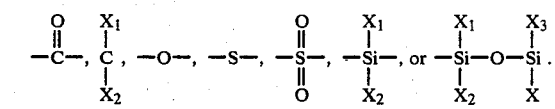

2. The process of claim 1 where

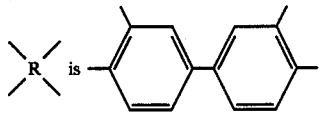

3. The process of claim 1 where

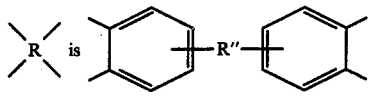

4. The process of claim 3 where —R"— is

5. An aromatic polyimide gas separation membrane consisting essentially of repeating linear units of the formula

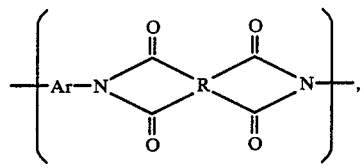

where —Ar— is

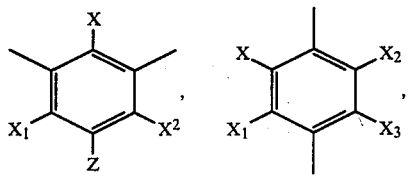

or mixtures thereof,

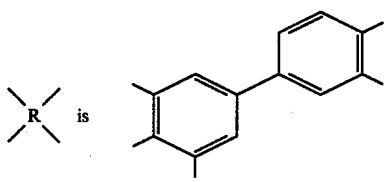

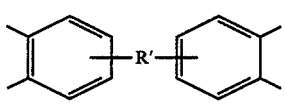

or mixtures thereof, where —X, $X_1$, $X_2$, and $X_3$ are independently primary or secondary alkyl groups hav-ing 1 to 6 carbon atoms, —Z is —H, —X, —$X_1$, —$X_2$, or —$X_3$ and R' is

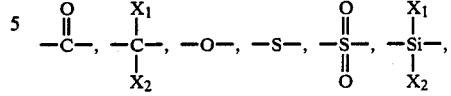

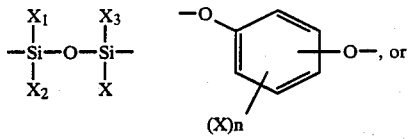

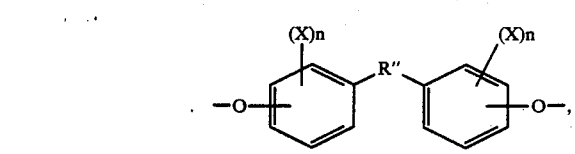

or alkylene radicals of 1 to 3 carbon atoms and where n=0 to 4,
—R"— is

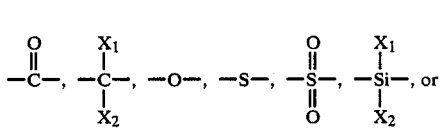

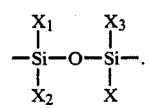

6. The aromatic polyimide gas separation membrane of claim 5 where

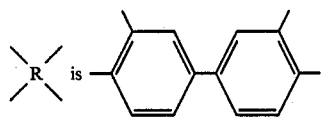

7. The aromatic polyimide gas separation membrane of claim 5 where

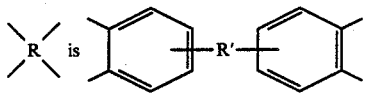

8. The aromatic polyimide gas separation membrane of claim 7 where —R'— is

* * * * *